July 17, 1934.   G. A. FISHER   1,967,145
SEALING AND IDENTIFYING DEVICE FOR DISPLAY HOLDERS
Filed Sept. 7, 1933
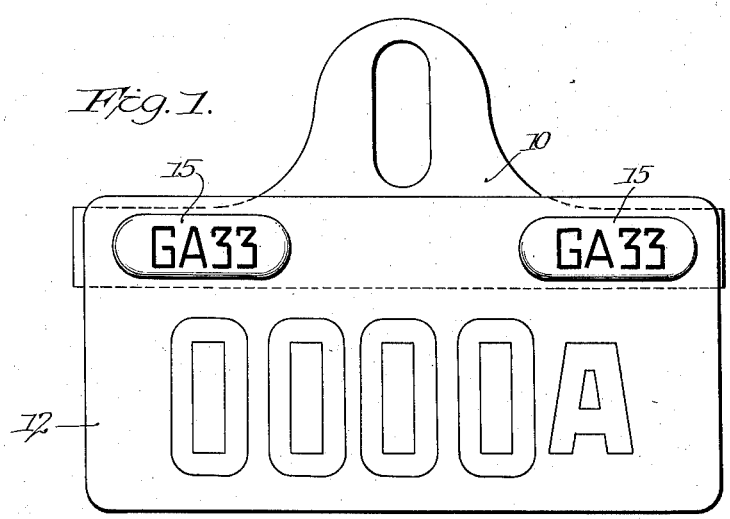
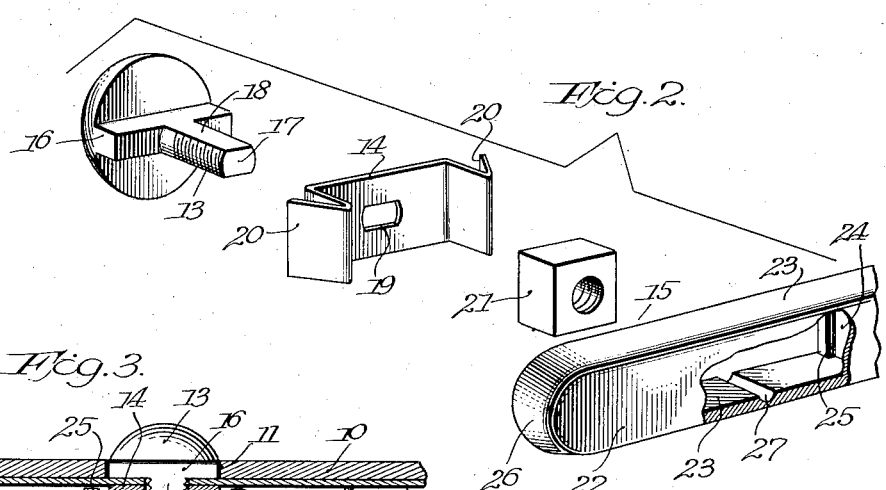
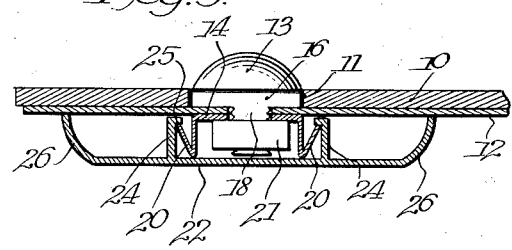
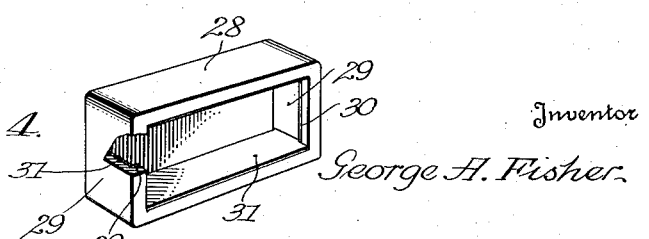
Inventor
George H. Fisher
By Cushman, Darby & Cushman
Attorneys Patented July 17, 1934

1,967,145

UNITED STATES PATENT OFFICE 1,967,145

SEALING AND IDENTIFYING DEVICE FOR DISPLAY HOLDERS

George A. Fisher, Milledgeville, Ga.

Application September 7, 1933, Serial No. 688,516

9 Claims. (Cl. 40—125)

This invention relates to a sealing and an identifying device for display holders and is an improvement upon Patent No. 1,914,773, issued to me, June 30, 1933. In the patented construction the frangible sealing member is capable of being turned or rotated upon the washer after being locked in sealing position. In view of the fact that identification indicia is usually inscribed upon the face of the sealing member, any gradual turning movement would eventually move the seal to a position where the indicia would be indistinguishable or difficult to identify. The present invention is designed to prevent such turning and to provide a construction wherein the sealing member is not only locked against removal but is also held in a fixed position relative to the bolt and washer or locking plate.

Various other objects and advantages will appear in the description of the invention and as disclosed in the drawing.

With reference to the drawing,

Figure 1 discloses a view of the license plate holder or bracket showing the identifying indicia both on the license plate and upon the device forming the present invention;

Figure 2 discloses a perspective of the various elements forming the invention;

Figure 3 discloses a side sectional view of the invention; and

Figure 4 discloses a modified form of the sealing member.

Referring more particularly to the drawing, in which like numbers indicate like parts, the numeral 10 indicates a holder or bracket of the usual type used on motor vehicles to support the license plates and is provided with apertures 11. The license plate is indicated by the numeral 12 and when properly positioned, its upper edge portion is usually contiguous with the lower edge portion of the holder.

The sealing and identifying device forming the subject matter of the present invention, as shown in Figures 2 and 3, comprises a bolt 13, a washer or spring locking plate 14 and a frangible sealing member 15 adapted when in operative position to receive and conceal the locking plate and to be irremovably and non-rotatably secured thereto. The apertures 11 of the bracket 10 comprise substantially elongated slots or openings which receive ribs 16 of the bolts 13 and thus prevent any rotary or turning movement of the bolts relative to the bracket when they are secured in position on the latter. The shank 17 of each bolt, in addition to having the usual threads, is provided with opposed flat sides 18 and the spring locking plate 14 is provided with a central elongated slot or opening 19 receiving the shank 17. With this arrangement, the spring locking member is also prevented from turning relative to the bolt 13.

While the locking plate 14 may be made in various shapes and forms, in the present invention I have shown the same as being of substantially oblong formation and provided at opposite ends with substantially inverted V-shaped seal engaging portions 20, these portions projecting upwardly from the base of the locking plate.

A nut 21 is adapted to be threaded upon the shank 17 of the bolt to clamp the spring plate and license plate to the bracket 10.

In configuration, the sealing member 15 is substantially hollow and rectangular in formation, having a flat face or body portion 22, side walls 23 and transverse or end walls 24 provided adjacent the free edges thereof with interior shoulders 25.

In the preferred form of the invention the side walls 23 are extended on both sides and are joined by curved walls 26. This arrangement increases the length of the outer, flat face of the sealing member and thus provides a greater area upon which identifying indicia may be inscribed. The sealing member may be made of a variety of frangible material in order that it may be shattered upon proper impact.

On the face of the sealing member it is proposed to inscribe identification indicia such as, for instance, the symbols of the State from which and the year in which issuance of the motor vehicle license is made. Such procedure will necessitate only the issuance annually to motor vehicle owners of the sealing member, eliminating thereby the issuance of the entire license plate which will have inscribed thereon only the identifying numbers and if desired, the symbols of the State of issuance.

Assembly of the device for operation is well shown in Figures 2 and 3. Each bolt 13, is inserted into the aperture 11 of the holder or bracket and through the usual aperture of the license plate. The washer or spring locking plate 14 is then placed in position and the nut 21 screwed on the shank of the bolt to securely hold the license plate and spring locking plate. The sealing member is now snapped over the spring arms or engaging portions 20 of the locking plate and the extreme edges of the arms 20 engage and cooperate with the shoulders 25 of the sealing member so that the latter is irremovably locked in place and cannot be removed except by the breakage thereof. By reason of the spring locking plate being oblong and the sealing member rectangular, any relative rotary or turning movement between these two members will be prevented. Likewise, by reason of the elongated aperture 19 and the flat portions of the shank 17, the locking plate will be prevented from turning movement relative to the bolt and bracket.

In order that the device be removed, it is necessary to shatter the frangible sealing member by proper impact which will expose the various parts of the device. To facilitate shattering of the sealing member, the walls 23 are preferably provided with centrally disposed weakened areas 27.

Obviously, when the frangible sealing member has been destroyed, an important part of the motor vehicle license has also been destroyed, so that the illegal substitution or transference of one license plate for another would be easily detected, since the necessary indicia appearing on the face of the sealing member would be lacking.

Furthermore, the license plate may be permanently issued for use from year to year and removal of the license may be readily accomplished at relatively small expense by breaking off the sealing member with its identifying indicia and substituting therefor a sealing element bearing the indicia or other identifying characteristics of a succeeding year, without the necessity of renewing or removing the license plate.

It is possible, of course, and contemplated where desirable and necessary that more than two spring arms or engaging means may be provided and the form illustrated in Figures 1 to 3 disclose only one instance of non-circular locking plates and sealing members to prevent relative rotation of these parts.

In Figure 4, there is disclosed a substantially rectangular frangible sealing member 28 similar to the seal 15 except that the side walls and body portion are not extended beyond the transverse end walls. The end walls 29 are provided with shoulders 30 similar to the shoulders 25, and if desired, the walls and shoulders may be covered by a liner or bushing 31. Assembly of this sealing member is similar to that of the member 15, and when it is snapped over the spring locking plate, it is likewise irremovably locked in place and held from rotary or turning movement relative to the locking plate.

There are, of course, various modifications and changes in the invention which may be contemplated and allowed within the scope of the appended claims.

I claim:—

1. In combination with a display element, means for locking the display element to a support including a bolt piercing the display element, a spring locking plate secured to the bolt and held against rotary movement with respect thereto, a hollow sealing member receiving and concealing the locking plate, and inter-engaging means on said locking plate and sealing member cooperating to irremovably retain the sealing member in place and hold the same against rotary or turning movement on said locking plate.

2. In combination with a display element, means for locking the display element to a support including a bolt piercing the display element, a spring locking plate provided with spaced straight end portions and secured to the bolt and held against rotary movement with respect thereto, and a hollow sealing member receiving and concealing the locking plate and having interiorly arranged straight shoulders engageable with the straight end portions of said locking plate to retain the sealing member in place and against rotation.

3. In combination with a display element, means for locking the display element to a support including a bolt piercing the display element, a substantially oblong spring locking plate provided at its ends with substantially inverted V-shaped engaging portions and secured to the bolt and held against rotary movement with respect thereto, and a substantially hollow rectangular sealing member receiving and concealing the locking plate and provided with interiorly arranged shoulders cooperating with the inverted V-shaped engaging portions of the locking plate for securing the sealing member in place.

4. In combination with a display element, means for locking the display element to a support including a bolt piercing the display element, a substantially oblong spring locking plate provided at its ends with substantially inverted V-shaped engaging portions and secured to the bolt and held against rotary movement with respect thereto, and a substantially hollow rectangular sealing member receiving and concealing the locking plate, said sealing member having a flat body portion and side and end walls surrounding said body portion, said end walls provided with interior shoulders adjacent their free edges cooperating with the inverted V-shaped engaging portions of the locking plate for securing the sealing member in place.

5. In combination with a display element, means for locking the display element to a support including a bolt piercing the display element and having its shank formed with spaced flat sides, a spring locking plate secured to the bolt and provided with seal engaging means and a central elongated aperture receiving and fitting the bolt, and a hollow sealing member receiving and concealing the locking plate and having interiorly arranged means cooperating with the engaging means of the locking plate to retain the sealing member in place and against rotation.

6. In combination with a display element, means for locking the display element to a support including a bolt piercing the display element, a spring locking plate provided with spaced seal engaging means and secured between its ends to the bolt, and a substantially hollow rectangular sealing member receiving and concealing the locking plates, said sealing member having a flat body portion and side and transverse walls, the transverse walls connecting the side walls between the center and ends of the body portion, certain of said walls provided with interior shoulders cooperating with the seal engaging means of said locking plate to retain the sealing member in place, said body portion and side walls extending beyond the confines of said transverse walls to provide indicia inscribing surfaces.

7. In combination with a display element, means for locking the display element to a support including a bolt piercing the display element, a substantially hollow sealing member having a flat body portion and side and transverse walls, the transverse walls connecting the side walls between the center and ends of the body portion, said side and transverse walls defining a rectangular cavity and said transverse walls being provided with shoulders located in the cavity, and a spring locking plate secured to said bolt and concealed within and fitting the cavity, and provided with locking elements engaging said shoulders, said body portion and side walls extending beyond the confines of said transverse walls to provide indicia inscribing surfaces.

8. A frangible sealing member for use in securing a display element to a support comprising a hollow substantially rectangular casing having a flat body portion and side and transverse walls, the transverse walls connecting the side walls between the center and ends of the body portion, said side and transverse walls defining a rectangular cavity for receiving and concealing a locking plate having spaced portions, said transverse walls being provided with shoulders located in the cavity and adapted to engage said spaced portions of the locking plate, said body portion and side walls extending beyond the confines of said transverse walls to provide indicia inscribing surfaces.

9. In combination with a display element, means for locking the display element to a support, including a bolt piercing the display element, a hollow sealing member having spaced interiorly arranged side faces, and a spring locking plate secured to the bolt and held against rotary movement with respect thereto, said locking plate extending into the hollow sealing member and having spaced resilient portions engaging the sealing member interiorly thereof, the spring locking plate being provided between the said engaging portions with continuous side edges fitting the side faces of the sealing member and holding the latter against rotary movement on the bolt.

GEORGE A. FISHER.